United States Patent [19]

Clark

[11] Patent Number: 4,860,938

[45] Date of Patent: Aug. 29, 1989

[54] AUTOMATED METHOD OF BRAZING

[75] Inventor: Clair D. Clark, Louisville, Ky.

[73] Assignee: General Electric Company, Louisville, Ky.

[21] Appl. No.: 215,863

[22] Filed: Jul. 6, 1988

[51] Int. Cl.⁴ .............................................. B23K 1/19
[52] U.S. Cl. ................................... 228/102; 228/239; 228/9; 228/902
[58] Field of Search ............... 228/239, 102, 183, 184, 228/9, 902; 219/130.5

[56] References Cited

U.S. PATENT DOCUMENTS

| | | | |
|---|---|---|---|
| 3,426,953 | 2/1969 | Metzger et al. | 228/183 |
| 3,717,743 | 2/1973 | Costello | 219/85 |
| 3,778,581 | 12/1973 | Denny | 219/85 |
| 3,891,822 | 6/1975 | Laub et al. | 219/85 |
| 4,143,802 | 3/1979 | Winterbottom | 228/217 |
| 4,152,571 | 5/1979 | Shimada et al. | 219/85 M |
| 4,240,574 | 12/1980 | Schmatz et al. | 228/217 |
| 4,484,054 | 11/1984 | Morino | 219/85 M |

Primary Examiner—Nicholas P. Godici
Assistant Examiner—Samuel M. Heinrich
Attorney, Agent, or Firm—Frederick P. Weidner; Radford M. Reams

[57] ABSTRACT

An automated method of brazing to join two metal parts together at a joint with a braze alloy. The two parts are moved to a brazing station and maintained in a fixed position. The two metal parts are heated at the joint at a high heat rate to a predetermined temperature which exceeds the temperature that would melt the braze alloy and less than a temperature that would cause degradation of the metal parts. The temperature of the metal parts in close proximity to the joint is detected and when the first predetermined temperature is reached, the heating rate is reduced to a lower heat rate sufficient to keep the braze alloy in a liquidous state. The braze alloy is introduced to the joint between the two metal parts while they are being heated at the lower heat rate to join the two parts together and then the joined two metal parts are removed from the brazing station.

5 Claims, 2 Drawing Sheets

AUTOMATED METHOD OF BRAZING

BACKGROUND OF THE INVENTION

Brazing two metal parts together such as two tubes, one telescoped inside the other, is accomplished by heating the area of the joint between the two tubes usually by ignition of a gas/oxygen mixture and introducing a braze alloy to the area to be joined, causing the alloy to melt and form around the area to be joined. With removal of the heat the alloy will solidify and seal the joint between the two tubes. Such brazing processes have been used particularly in sealing metal tubes such as copper to copper or copper to steel in hermetic sealed refrigerant systems used in refrigerators and air conditioners. Because the refrigerant system is to be hermetically sealed, each of the joints must be leakproof, which requires a high quality brazing operation. A good brazed joint is usually leakproof if the temperature of the two tubes to be joined together have been sufficiently heated to adequately melt and distribute the braze alloy around the joint area. On the otherhand, the two tubes should not be overheated to the extent that parent metal of the tubes may be burnt off. The result of overheating is degradation of the tubes in the area of the joint as they become brittle and in subsequent usage these tubes are frequently bent and if the tubes are too brittle, then they will crack and produce a leak.

In providing an automated brazing operation to join two metal parts together at a joint with a braze alloy, such as two metal tubes, one telescoped inside the other, there are two major failure modes associated with producing a good leakproof joint, namely, the joint is too cool to adequately melt and distribute the alloy around the joint or the joint is overheated resulting in degradation of the parts in the area of the joint. These failures can be caused by variations in temperature of the joint area due to variation in part mass and location, the quality and density of the gas being used to heat the joint, the improper mixture of the gas and oxygen to produce the flame, ambient temperature, and natural convection that occurs around the parts to be joined. Therefore, in automating a brazing operation it is important to control the temperature of the joint area as much as possible. In addition, it is advantageous to have a short cycle time for the braze operation so that production quantities can be increased without additional brazing equipment being needed.

By this invention there is provided an automated method of brazing to join two metal parts together at a joint with a braze alloy that produces a good joint by having adequate heat to melt and distribute the braze alloy around the joint but not too high a heat that would detrimentally affect the two parts being joined together and the process has a short cycle time per brazed joint.

SUMMARY OF THE INVENTION

An automated method of brazing to join two metal parts together at a joint with a braze alloy. The method includes moving the two parts to a brazing station and maintaining the two parts in a fixed position. The two metal parts are heated at the joint at a high heat rate to a predetermined temperature which exceeds the temperature that would melt the braze alloy and less than a temperature that would cause degradation of the metal parts. The temperature of the metal parts is detected in close proximity to the joint where the parts are to be joined together. When the temperature of the metal parts reaches the predetermined temperature, the heating rate is reduced responsive to detection of the predetermined temperature to a lower heat rate sufficient to keep the braze alloy in a liquidous state. The braze alloy is introduced to the joint between the two metal parts while they are being heated at the lower heat rate to join the two parts together and then the joined metal parts are removed from the brazing station.

BRIEF DESCRIPTION OF THE DRAWINGS

A With reference to the accompanying drawing.

DESCRIPTION OF THE PREFERRED EMBODIMENT

Figure 1:
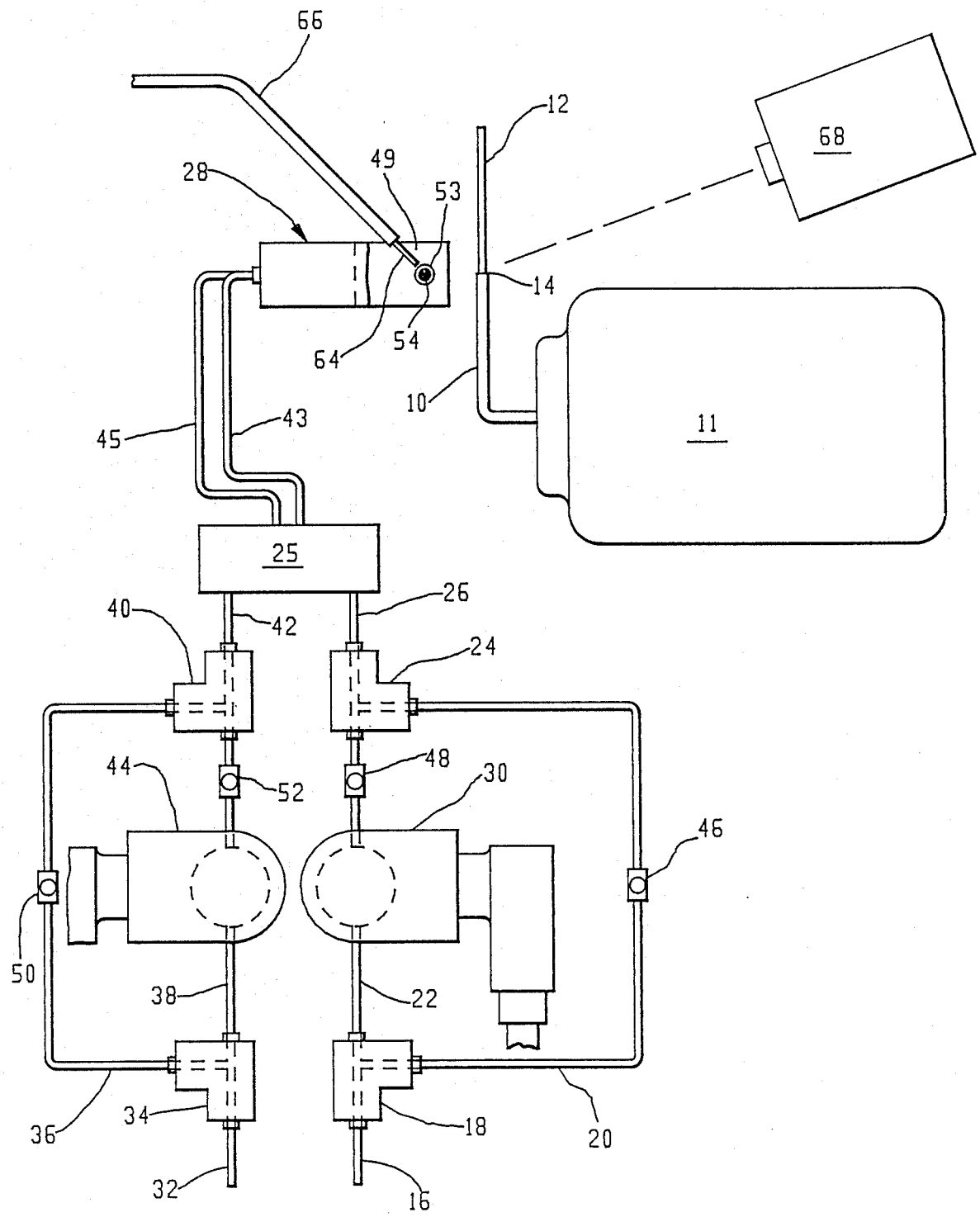
FIG. 1 is a schematic diagram of the automated method of brazing in accordance with the present invention.

With reference to FIG. 1 of the accompanying drawings, there is shown diagrammatically the automated method of brazing in accordance with the present invention. The brazing operation is for joining two metal parts together such as a first tube 10 and a second tube 12 which in the case of the preferred embodiment is utilized in a refrigeration system that includes a compressor 11. The joined metal tubes are to be assembled in a hermetic refrigeration system. The second tube 12 has a smaller diameter than tube 10 and is telescoped inside tube 10. These two tubes are to be joined together to form a joint 14 by the brazing operation of this invention.

As is the usual case for a brazing operation, the tubes to be joined together are heated by ignition of a mixture of gas and oxygen to produce a flame and the two tubes are heated at the joint 14 sufficiently so that a brazing alloy will melt and wet the area to be joined and with removal of the heat source the braze alloy will solidify and seal the joint. To accomplish this operation in an automated assembly line in accordance with this invention, there is provided a gas inlet line 16 from a gas supply. From line 16 the gas enters a first T-joint 18 which splits the gas flow into a first branch 20 and a second branch 22. Gas flowing in branch 20 enters a second T-joint 24 and flows into a mixing chamber 25 via gas line 26.

Branch 22 has a solenoid valve 30 that acts as a flow control valve and when activated will open the second branch 22 to gas flow through that branch into the second T-joint 24 and to the mixing chamber via gas line 26. When the solenoid valve 30 is deactivated gas is prevented from flowing through the second branch 22.

Figure 2:
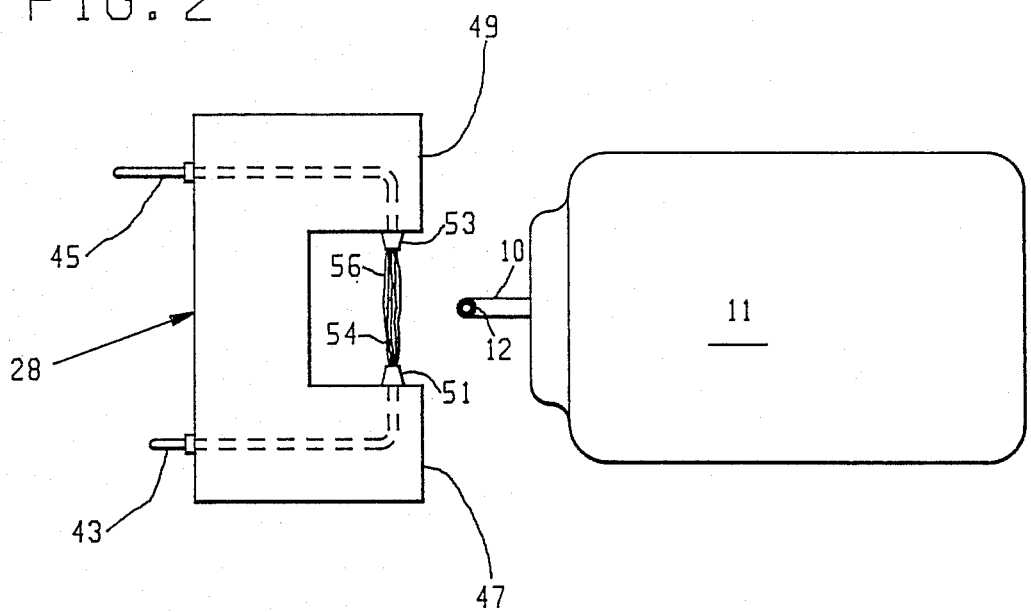
FIG. 2 is a top plan view of the two metal parts to be joined together and the burner head utilized in the present invention and shown prior to heating the joint between the two metal parts.
Figure 3:
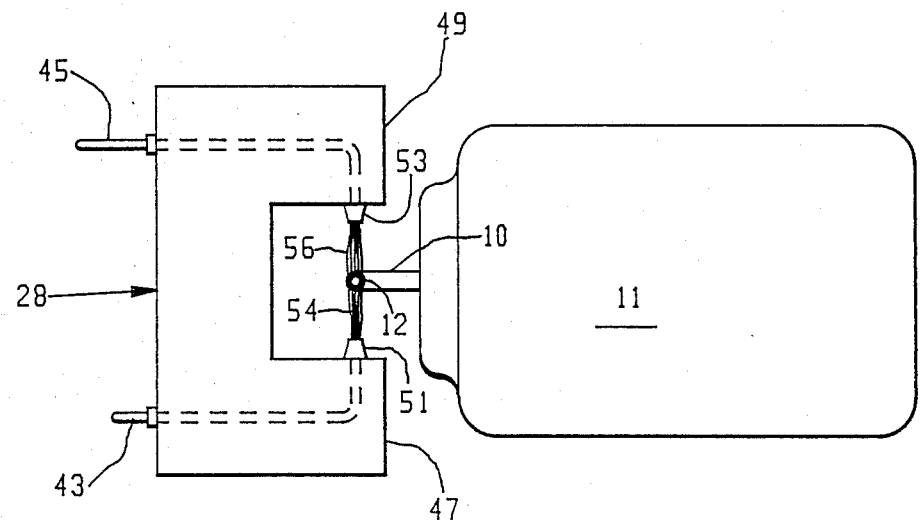
FIG. 3 is similar to FIG. 2 showing heating the joint.

Oxygen for mixing with the gas is received from an oxygen supply and flows through oxygen inlet line 32 to a third T-joint 34 where it is split or divided to flow into a first branch 36 and a second branch 38. Oxygen flowing through the first branch enters a fourth T-joint 40 and through oxygen line 42 to the mixing chamber 25. The second branch 38 has a solenoid valve 44 that acts as a flow control valve and when activated will open the second branch to allow the flow of oxygen therethrough to the fourth T-joint 40 and then to the mixing chamber 25 via oxygen line 42. When deactivated the solenoid valve 44 will close and prevent the flow of oxygen through the second branch 38. It will be understood that the equipment for supplying gas and the equipment for supplying oxygen are similar and their arrangement as shown in the drawings may be interchangeable. The gas and oxygen introduced into the mixing chamber 25 is mixed and flows via lines 43 and 45 to burner head 28. As seen in FIGS. 2 and 3, the burner head 28 is U-shaped having two legs 47 and 49 spaced from each other with lines 43 and 45 passing through legs 47 and 49 respectively. Gas and oxygen mixture orifices 51 and 53 for lines 43 and 45 respectively exit the two legs 47 and 49 opposite each other so that ignition of the mixture provides flames 54 and 56 between the orifices 51 and 53.

As with any brazing operation, it is often necessary to adjust the amount of gas and the amount of oxygen being delivered for mixing in the mixing chamber 25 so that the flame is satisfactory for the brazing operation. The quality of gas and the quality of oxygen often times vary so that there needs to be an adjustment regarding the gas/oxygen relationship. For this purpose there is provided a needle valve 46 in the first branch 20 of the gas line and also a needle valve 48 in the second branch 22 of the gas line, both needle valves being manually adjustable to regulate the amount of gas flow through each of the respective branches. On the oxygen side there is also provided a needle valve 50 in the first branch 36 of the oxygen supply and a needle valve 52 in the second branch 38, both needle valves again being manually adjustable to regulate the amount of oxygen flowing through each of the respective branches.

In the automated method of brazing of the preferred embodiment the compressor 11 carrying with it first tube 10 and second tube 12 telescoped in first tube 10 is moved to the brazing station on an assembly line. In the preferred embodiment this is accomplished by a movable pallet that holds the compressor in place and is moved down a conveyor line to the brazing station. Means are provided to move the burner head and the two tubes 10 and 12 to be joined relative to each other to position the joint 14 between the orifices 51 and 52 in the burner head 28 as shown in FIG. 3. While the tubes 10 and 12 are maintained in a fixed position between the orifices 51 and 53, the joint area is heated by the gas/oxygen mixture being ignited and the flames 54 and 56 impinge upon the joint 14 between the two metal tubes to be joined. When the joint is heated sufficiently, wire brazing alloy 64 fed through a conduit 66 from a spool (not shown) is introduced to the joint 14. The heat applied to the joint 14 melts the alloy whereupon it flows around the joint 14 and when the heat is removed the alloy will solidify, thereby sealing the joint 14.

In automating the brazing operation it was found to be advantageous to heat the joint between the two tubes at two different heat rates. Heat rate is a function of time and temperature. The higher the temperature the shorter time it takes to reach a predetermined temperature and vice versa. In an automated brazing operation it is advantageous to keep the time short, thereby reducing the brazing operation cycle time to increase productivity. Initially the joint 14 between tubes 10 and 12 are heated at a high heat rate to a predetermined temperature that exceeds the temperature that would melt the braze alloy. The predetermined temperature should not exceed the temperature that would detrimentally affect the parent metal of the tubes 10 and 12. That is, the temperature should not cause metal to burn off of the tubes as that would subsequently cause them to become brittle and since these tubes are often bent or moved to accommodate the rest of the hermetic refrigeration system, their embrittlement could cause rupture during handling resulting in failure of the hermetic refrigeration system. Therefore, the predetermined temperature should be less than a temperature that would cause such degradation of the tubes 10 and 12. Detecting the temperature of the metal tubes at the joint 14 is by means of a radiometer 68 which is in effect an infrared thermometer. These radiometers are commercially available and one such radiometer is sold by Ircon Inc. as their Maxline indicator unit model MX-XXXX-XXXX-2-2/0-0-0 which includes a Maxline sensing head model MX-MG05. Prior to the detection of the predetermined temperature the high heat rate is applied to the tubes 10 and 12 by having both branches 20 and 22 of the gas supply and branches 36 and 38 of the oxygen supply open so that maximum gas and oxygen is supplied for mixing in the mixing chamber 25 and delivered to the burner head 28. Once the radiometer detects the predetermined temperature a control signal is sent to the solenoids 30 and 34 to close the solenoids and prevent flow of gas through branch 22 and the flow of oxygen through branch 38. With those two branches closed only gas through branch 20 and oxygen through branch 36 is supplied to the burner head 28, thus the joint 14 is being heated at a lower heat rate but it should be sufficient to keep the braze alloy in a liquidus state. When the joint 14 between the tubes 10 and 12 is being heated at the lower heat rate, brazing alloy 64 is fed onto the joint 14 whereupon the braze alloy melts and wets the joint 14 and when solidified after removal of the heat will seal the joint 14. Feeding of the wire brazing alloy 64 may be automated so that when the predetermined temperature is reached, a control signal is sent to an alloy wire feeding mechanism (not shown) to initiate feeding the wire brazing alloy 64 to the joint 14 and timing the feed to introduce the correct amount of brazing alloy 64 to the joint 14. Such controllers and feeding mechanisms are available commercially and can be easily installed by a person having ordinary skill in this type of equipment. When the brazing operation is complete, the two metal tubes that have been joined and are carried by the compressor 11 on the movable pallet are removed from the brazing station and the assembly may continue down the assembly line for further assembly operations.

Means to generate the control signal tied to the radiometer that controls the solenoids 30 and 34 may be accomplished in many different ways, all of which can be easily devised by a person having ordinary skill in the art of basic control systems utilizing commercially available control components. Therefore, for the purposes of this invention it is not necessary to describe in detail any such control system.

As is usually the case in brazing operations, if the two parts to be joined together are dissimilar metals such as tube 10 being steel and tube 12 being copper, the joint 14 is coated with a brazing flux prior to moving the tubes to be joined to the brazing station. While it is shown that the brazing operation is carried out with the two tubes 10 and 12 in a vertical position, they could be horizontal. In the preferred method the burner head 28 has two orifices 51 and 53; however, more orifices may be used depending upon the design of the burner head.

In the preferred method of this invention the tube 10 is steel and the tube 12 is copper with a flux introduced at the joint 14 in a prior station of the assembly line and in the brazing station the predetermined temperature is about 1350 degrees Fahrenheit. The braze alloy is 38% silver and melts at about 1200 degrees Fahrenheit. Degradation of the metal tubes would occur at about 1600 degrees Fahrenheit. With this method the cycle time for the brazing operation is quite fast. For instance, in the preferred method the brazing operation only takes about five seconds with the braze alloy being fed to the joint 14 for about three seconds. With such a relatively fast brazing operation one advantage is that by reducing the brazing operation cycle time, less brazing stations are needed to accomplish the brazing operation for a given amount of work pieces passing down the assembly line.

In the preferred method of automated brazing it is desirable to sense the presence or absence of tube 12 so that the automated brazing operation will not take place if tube 12 is absent. Any means for detecting tube 12 may be used, such as for instance, it may be accomplished at a station in the assembly line prior to the brazing operation station, such as when flux is applied to the joint 14 and it may be simply a feeler wire that will interrupt the brazing operation by a micro-switch that will turn the brazing operation off if the tube 12 is not detected.

While there has been shown and described a process and a specific embodiment of the equipment used in the process, it will be understood that it is not limited thereto and it is intended by the appended claims to cover all such modifications as fall within the true spirit and scope of the invention.

What is claimed is:

1. An automated method of brazing to join two metal parts together at a joint with a braze alloy comprising:
   moving the two parts to a brazing station,
   maintaining the two parts in a fixed position,
   heating the two metal parts at the joint at a high heat rate to a predetermined temperature which exceeds the temperature that would melt the braze alloy and less than a temperature that would cause degradation of the metal parts, said heating being by a flame from ignition of a gas and oxygen mixture exiting a burner head which is fed by a gas line and an oxygen line, each line having two parallel branches with one branch of each line having a flow control valve in an open position to accomplish the high heat rate,
   detecting the temperature of the metal parts in close proximity to the joint where the parts are to be joined,
   reducing the heating rate responsive to detection of the predetermined temperature to a lower heat rate sufficient to keep the braze alloy in a liquidus state, said lower heat rate being accomplished by closing the flow control valves,
   introducing the braze alloy to the joint between the two metal parts while they are being heated at the lower heat rate to join the two metal parts together, and
   removing the joined two metal parts from the brazing station.

2. The automated method of brazing according to claim 1 wherein the temperature of the metal parts is measured by an infrared thermometer.

3. The automated method of brazing according to claim 1 wherein each branch has an adjustment valve for adjusting the gas to oxygen mixture.

4. The automated method of brazing according to claim 1 wherein the two metal parts to be joined are tubes with one tube fitting inside the other tube and the braze alloy is introduced at the joint where the one tube fits inside the other.

5. The automated method of brazing according to claim 4 wherein the tubes to be joined together are held in a vertical position.

* * * * *